(12) United States Patent
Buri et al.

(10) Patent No.: US 9,260,610 B2
(45) Date of Patent: Feb. 16, 2016

(54) USE OF 2-AMINO-2-METHYL-1-PROPANOL AS ADDITIVE IN AQUEOUS SUSPENSIONS OF CALCIUM CARBONATE COMPRISING MATERIALS

(75) Inventors: Matthias Buri, Rothrist (CH); Samuel Rentsch, Aarburg (CH); Patrick Arthur Charles Gane, Rothrist (CH)

(73) Assignee: Omya International AG, Oftringen (CH)

( * ) Notice: Subject to any disclaimer, the term of this patent is extended or adjusted under 35 U.S.C. 154(b) by 688 days.

(21) Appl. No.: 13/386,786

(22) PCT Filed: Aug. 5, 2010

(86) PCT No.: PCT/IB2010/053546
§ 371 (c)(1),
(2), (4) Date: Mar. 26, 2012

(87) PCT Pub. No.: WO2011/016003
PCT Pub. Date: Feb. 10, 2011

(65) Prior Publication Data
US 2012/0256140 A1 Oct. 11, 2012

Related U.S. Application Data

(60) Provisional application No. 61/274,020, filed on Aug. 12, 2009.

(30) Foreign Application Priority Data

Aug. 5, 2009 (EP) .................................... 09167246

(51) Int. Cl.
*H01B 1/12* (2006.01)
*C07C 215/00* (2006.01)
*C09C 1/02* (2006.01)
*H01B 1/06* (2006.01)

(52) U.S. Cl.
CPC *C09C 1/021* (2013.01); *H01B 1/06* (2013.01); *C01P 2006/40* (2013.01); *C01P 2006/62* (2013.01); *C01P 2006/64* (2013.01)

(58) Field of Classification Search
None
See application file for complete search history.

(56) References Cited

U.S. PATENT DOCUMENTS

| 3,896,827 A * | 7/1975 | Robinson ........................ 134/10 |
| 7,615,587 B2 * | 11/2009 | Qiu et al. ........................ 524/425 |
| 2003/0232906 A1 * | 12/2003 | Ghosh ............................ 524/82 |
| 2008/0004202 A1 * | 1/2008 | Wolfgang et al. ............. 510/439 |
| 2010/0222484 A1 * | 9/2010 | Buri et al. ...................... 524/425 |

FOREIGN PATENT DOCUMENTS

| CN | 1 986 652 A | 6/2007 | | |
| CN | 101624509 A | 1/2010 | | |
| WO | 9849261 A1 | 11/1998 | | |
| WO | WO 01/77273 A1 | 10/2001 | | |
| WO | WO 2007/083208 | * | 7/2007 | ............... C09C 1/02 |
| WO | WO 2013/095961 | * | 6/2013 | ............... C09C 1/02 |

OTHER PUBLICATIONS

Angus Chemical Company: "AMP: 2-Amino-2-Methyl-1-Propanol Solution" Technical Bullentin, [Online] Jan. 15, 2007, pp. 1-3, XP002547910.
The International Search Report dated Sep. 16, 2010 for PCT Application No. PCT/IB2010/053546.
The Written Opinion of the International Searching Authority for PCT Application No. PCT/IB2010/053546 dated Sep. 16, 2010.
Office Action dated Mar. 19, 2013 for Chinese Application No. 201080034383.4.
Office Action dated Feb. 25, 2014 for Japanese Application No. 2012-523422.

* cited by examiner

*Primary Examiner* — Mark Kopec
*Assistant Examiner* — Jaison Thomas
(74) *Attorney, Agent, or Firm* — Amster, Rothstein & Ebenstein LLP

(57) ABSTRACT

Use of 2-amino-2-methyl-1-propanol (AMP) as an additive in an aqueous suspension, containing from 25 to 62 vol. % of at least one calcium carbonate-comprising material and having a pH of between 8.5 and 11, to increase the suspension pH by at least 0.3 pH units, the AMP being added to said suspension in an amount of from 500 to 15000 mg per litre of the aqueous phase of the suspension, wherein the suspension conductivity change is maintained to within 100 µS/cm/pH unit.

20 Claims, No Drawings

USE OF 2-AMINO-2-METHYL-1-PROPANOL AS ADDITIVE IN AQUEOUS SUSPENSIONS OF CALCIUM CARBONATE COMPRISING MATERIALS

CROSS-REFERENCE TO RELATED APPLICATIONS

This application is U.S. National phase of PCT Application No. PCT/IB2010/053546, filed Aug. 5, 2010, which claims priority to European Application No. 09167246.9, filed Aug. 5, 2009 and U.S. Provisional Application No. 61/274,020, filed Aug. 12, 2009.

The present invention relates to the technical domain of aqueous suspensions of calcium carbonate-comprising materials and additives added thereto.

In the preparation of aqueous suspensions of calcium carbonate-comprising materials, the skilled man is often required to select and introduce additives in order to regulate one or more characteristics of this suspension.

In making this additive selection, the skilled man must bear in mind that this additive should remain cost efficient and should not lead to unwanted interactions or effects downstream during the transportation, processing and application of this suspension.

Among the considerations of the skilled man that have rarely been addressed but which the Applicant has realized is of importance, is the selection of additives that do not cause a significant variation, and namely increase, in the electrical conductivity of the calcium carbonate-comprising material suspension.

Indeed, it may be advantageous to regulate aspect of the processing and transport of such a suspension based on measurements of the suspension's electrical conductivity.

For example, the flow rate of such a suspension through a given passage or unit may be controlled according to measurements made of the suspension conductivity. In the publication entitled "A Conductance Based Solids Concentration Sensor for Large Diameter Slurry Pipelines" by Klausner F et al. (J. Fluids Eng./Volume 122/Issue 4/Technical Papers), an instrument measuring the solids concentration of a slurry passing through pipelines of a given diameter based on conductance measurements is described. Based on these conductance measurements, it is possible to obtain a graphical display showing the variation of slurry concentration from the top to the bottom of the pipe, as well as the area-average concentration history.

The degree of filling of a container can likewise be managed by detecting conductivity at a given height along a container wall.

However, in order to use and take advantage of such regulation systems based on measurements of electrical conductivity, the skilled man is faced with the challenge of selecting additives needed to serve one or more functions that do not in parallel cause significant variations in the electrical conductivity values.

Among the functions of the additives used in calcium carbonate-comprising material suspensions, is the adjustment of the suspension pH, whether it is by acidification, neutralization, or alkalinisation of this suspension.

Suspension alkalinisation is notably required in order to match the pH of application environments into which the suspension is introduced, or in preparation for the addition of pH-sensitive additives. A step of raising the pH may also serve to disinfect or support the disinfection of a suspension. Adjustments to pH may be necessary to avoid the unwanted dissolution of calcium carbonate on contact with an acidic environment during processing.

Such pH adjusting additives used in aqueous suspension of calcium carbonate-comprising material suspensions and available to the skilled man are numerous.

A first group of additives that may be used to raise the pH of an aqueous suspension of calcium carbonate-comprising materials are hydroxide-containing additives, and are especially alkali and earth alkali metal hydroxides.

For example, U.S. Pat. No. 6,991,705 refers to increasing the alkalinity of a pulp suspension, which may comprise calcium carbonate, by a combination of an alkali metal hydroxide feed, such as a sodium hydroxide feed, and a carbon dioxide feed.

Potassium hydroxide, magnesium hydroxide and ammonium hydroxide are other such additives used to control the pH of a FCC suspension in a range from 10 to 13, as referred to in EP 1 795 502.

A second group of additives that may be used to raise the pH of an aqueous suspension of calcium carbonate-comprising materials are additives that do not contain hydroxide ions, but which generate such ions on reaction with water.

Such additives may be salts, such as sodium salts, of weak acids. Examples of this type of additive would include sodium acetate, sodium bicarbonate, potassium carbonate and alkaline phosphates (such as tripolyphosphates, sodium and/or potassium orthophosphates).

A further possibility is to employ nitrogen-based additives, including for example ammonia, amines and amides, in order to increase the pH of calcium carbonate-comprising material suspensions.

Notably, these may include primary, secondary or tertiary amines. Alkanolamines used to increase suspension pH include for example monoethanolamine (MEA), diethanolamine (DEA), and methylaminoethanol (MAE).

All of the above additives raise the pH of the aqueous suspension according to a common mechanism, which is by providing or creating, following reaction with water, hydroxide ions in the suspension.

From the literature, it is known that increasing the hydroxide ion concentration under alkaline condition leads in parallel to an increased conductivity ("Analytikum", 5$^{th}$ Edition, 1981, VEE Deutscher Verlag für Grundstoffindustrie, Leipzig, page 185-186 referring to "Konduktometrische Titration").

Given the above general knowledge documented in the literature, along with the supporting evidence that alkali and earth alkali hydroxides, as well as amines such as triethanolamine cause a significant conductivity increase in parallel to raising the pH of an aqueous suspension of calcium carbonate-comprising materials, as shown in the Examples section hereafter, the skilled man could have no expectation that a particular pH regulating agent, that raises the suspension pH according to the same mechanism as these additives, i.e. the resulting introduction of hydroxide ions in the suspension, would cause only a minimal conductivity increase.

It was therefore entirely by surprise, and in contrast to the expectation based on common additives used to increase pH, that the Applicant identified that 2-amino-2-methyl-1-propanol (AMP) can be used as an additive in an aqueous suspension and having a pH of between 8.5 and 11 and containing from 25 to 62 vol. % of at least one calcium carbonate-comprising material, to increase the suspension pH by at least 0.3 pH units, while maintaining the suspension conductivity change to within 100 μS/cm/pH unit.

Therefore, a first object of the present invention resides in the use of 2-amino-2-methyl-1-propanol (AMP) as an additive in an aqueous suspension containing from 25 to 62 vol. % of at least one calcium carbonate-comprising material and having a pH of between 8.5 and 11, to increase the suspension pH by at least 0.3 pH units, characterized in that the suspension conductivity change is maintained to within 100 μS/cm/pH unit.

"Conductivity" according to the present invention shall mean the electrical conductivity of an aqueous carbonate-comprising material suspension as measured according to the measurement method defined in the Examples section herebelow.

For the purpose of the present invention, pH shall be measured according to the measurement method defined in the Examples section herebelow.

The volume % (vol. %) of a solid material in suspension is determined according to the method defined in the examples section hereafter.

In a preferred embodiment, said suspension has a conductivity of between 700 and 2000 μS/cm, and preferably of between 800 and 1300 μS/cm, prior to AMP addition.

In another preferred embodiment, following the addition of said AMP, the suspension conductivity is maintained to within 70 μS/cm/pH unit, and preferably to within 50 μS/cm/pH unit.

In another preferred embodiment, following the addition of said AMP, the change of suspension conductivity is maintained at a value within 10%, preferably within 6%, and more preferably within 3% of the suspension conductivity value prior to AMP addition.

In another preferred embodiment, prior to addition of said AMP, the suspension has a pH between 9 and 10.3.

In another preferred embodiment, AMP is added to said suspension in an amount to increase the pH of the aqueous suspension by at least 0.4 pH units.

When the suspension pH prior to AMP addition is between 8.5 and 9, said AMP is preferably added to said suspension in an amount to increase the pH of the suspension by at least 1 pH unit. In the case where the suspension pH prior to AMP addition is between 9 and 10, said AMP is preferably added to said suspension in an amount to increase the pH of the aqueous suspension by at least 0.7 pH units.

Prior to AMP addition, said suspension preferably has a temperature of between 5 and 100° C., more preferably of between 35 and 85° C., and even more preferably of between 45 and 75° C.

In a preferred embodiment, said AMP is added to said suspension in an amount of from 500 to 15000 mg, preferably of from 1000 to 5000 mg, and more preferably of 1300 to 2000 mg, per litre of the aqueous phase of said suspension.

AMP useful in the present invention may comprise impurities such as secondary alkanol amines, e.g. 2-methyl-2(methylamino)-1-propanol in an amount of less than 6% by weight, preferably in an amount of from 2 to 5% by weight, relative to the total weight of the impure AMP.

In a preferred embodiment, said calcium carbonate-comprising material in said aqueous suspension is dispersed, preferably with 0.1 to 1, more preferably 0.2 to 0.5 mg of dispersant per $m^2$ of mineral material, said dispersant being preferably an anionic dispersant, and more preferably a homo- or co-polymer of acrylic acid.

According to the present invention, a suitable dispersing agent may be an acrylic polymer, a vinylic polymer, an acrylic and/or a vinylic copolymer, and/or an inorganic dispersing agent. It is preferably selected from the group comprising mono-, di- and/or trisodium orthophosphate, sodium tripolyphosphate and sodium polyphosphate. According to the present invention, any acid groups contained in the dispersing agent are preferably partially or completely neutralized by sodium. Alternatively or additionally, the dispersing agent may be a comb polymer as described in WO 2004/041883.

In another preferred embodiment, prior to addition of said AMP, said suspension has an anionic charge of from 2 to 200, preferably of from 5 to 150, and more preferably of from 25 to 100 μVal/g of equivalent dry weight of mineral material. Said anionic charge is measured using the PET method described in the Examples section herebelow.

As regards said calcium carbonate-comprising material in suspension, this material preferably comprises at least 50%, preferably at least 80%, and more preferably at least 98% by weight of calcium carbonate relative to the total equivalent dry weight of said calcium carbonate-comprising material.

The calcium carbonate comprising material may be pure calcium carbonate, as well as materials such as composites or blends of carbonates, especially alkaline earth carbonates such as magnesium carbonate, dolomite, aluminum hydroxide, clays or talc.

The calcium carbonate of said carbonate-comprising material may be a precipitated calcium carbonate (PCC), a natural ground calcium carbonate (NGCC), a surface-reacted calcium carbonate (SRCC), or a mixture thereof.

Surface-reacted calcium carbonates are understood to refer to products resulting from the reaction of a calcium carbonate with an acid and carbon dioxide, said carbon dioxide being formed in situ by the acid treatment and/or supplied externally, and the surface-reacted natural calcium carbonate being prepared as an aqueous suspension having a pH of greater than 6.0, measured at 20° C. Such products are described in, among other documents, WO 00/39222, WO 2004/083316 and EP 2 070 991, the content of these references herewith being included in the present application.

In a preferred embodiment, said suspension comprises from 45 to 60 vol. % and preferably from 48 to 58 vol. % and most preferred from 49 to 57 vol. %, of said calcium carbonate-comprising material based on the total volume of said suspension.

In another preferred embodiment, said AMP is added prior to, during or after, and preferably after, a step of grinding said calcium carbonate-comprising material in said suspension.

It may also be advantageous that said AMP be added to the dry form of said calcium carbonate-comprising material, and possibly dry ground therewith, before forming said suspension of calcium carbonate-comprising material.

It is of note that AMP may be added to the suspension while shearing the suspension under low or high shear, since AMP rapidly distributes itself throughout the suspension.

Following addition of said AMP to said suspension, the suspension may be introduced in a unit equipped with a conductivity-based regulation device.

For example, the suspension may be introduced in a container or unit up to a level determined by measurement of the suspension conductivity.

The suspension may additionally or alternatively be passed though a passage having a suspension throughput regulated as a function of the suspension conductivity.

In this respect, "passage" can relate to a confined region of throughput, as well as a throughput without any definition of confinement, i.e. after one passage of the process.

The suspension resulting from the inventive use of AMP may be applied in a wide variety of domains, including in the paper and paint industries. The resulting suspension can also be dried to obtain a dry product, finding applications, for example in the plastic industry.

In view of the advantages of the use of AMP as described above, a further aspect of the present invention is a method to increase the pH of an aqueous suspension, containing from 25 to 62 vol. % of at least one calcium carbonate-comprising material and having a pH of between 8.5 and 11 by at least 0.3 pH units, by the use of 2-amino-2-methyl-1-propanol (AMP) as an additive as defined in detail above, wherein the suspension conductivity change is maintained to within 100 µS/cm/pH unit.

The scope and interest of the invention will be better understood based on the following examples which are intended to illustrate certain embodiments of the invention and are non-limitative.

EXAMPLES

Measurement Methods:
Suspension pH Measurement

The pH of a suspension is measured at 25° C. using a Mettler Toledo™ Seven Easy pH meter equipped with the corresponding Mettler Toledo™ pH expansion unit and a Mettler Toledo InLab® 730 Expert Pro pH electrode.

A three point calibration (according to the segment method) of the instrument is first made using commercially available buffer solutions having pH values of 4, 7 and 10 at 20° C. (from Aldrich™).

The reported pH values are the endpoint values detected by the instrument (the endpoint is when the measured signal differs by less than 0.1 mV from the average over the last 6 seconds).

Suspension Conductivity Measurement

The conductivity of a suspension is measured at 25° C. using Mettler Toledo™ Seven Multi instrumentation equipped with the corresponding Mettler Toledo™ conductivity expansion unit and a Mettler Toledo InLab® 730 conductivity probe, directly following stirring this suspension at 1500 rpm using a Pendraulik™ tooth disc stirrer.

The instrument is first calibrated in the relevant conductivity range using commercially available conductivity calibration solutions from Mettler Toledo™. The influence of temperature on conductivity is automatically corrected by the linear correction mode.

Measured conductivities are reported for the reference temperature of 20° C. The reported conductivity values are the endpoint values detected by the instrument (the endpoint is when the measured conductivity differs by less than 0.4% from the average over the last 6 seconds).

Particle Size Distribution (Mass % Particles with a Diameter<X) and Weight Median Grain Diameter ($d_{50}$) of Particulate Material Weight median grain diameter and grain diameter mass distribution of a particulate material are determined via the sedimentation method, i.e. an analysis of sedimentation behaviour in a gravimetric field. The measurement is made with a Sedigraph™ 5100.

The method and the instrument are known to the skilled person and are commonly used to determine grain size of fillers and pigments. The measurement is carried out in an aqueous solution of 0.1% by weight of $Na_4P_2O_7$. The samples were dispersed using a high speed stirrer and ultrasonic.

Volume Solids (Vol. %) of a Material in Suspension

The solids volume concentration is determined by dividing the volume of the solid material by the total volume of the aqueous suspension.

The volume of the solid material is determined by weighing the solid material obtained by evaporating the aqueous phase of suspension and drying the obtained material to a constant weight, and converting this weight value to a volume value by division with the density of the solid material.

The examples herebelow, employing a material consisting of essentially only calcium carbonate, used a density value of 2.7 g/ml, based on that listed for natural calcite in the Handbook of Chemistry and Physics (CRC Press; 60th edition), for the purpose of the above volume solids calculation.

Weight Solids (% by Weight) of a Material in Suspension

The weight of solids is determined by dividing the weight of the solid material by the total weight of the aqueous suspension.

The weight of the solid material is determined by weighing the solid material obtained by evaporating the aqueous phase of suspension and drying the obtained material to a constant weight Additive Addition Amount in Mg Per Litre of Aqueous Phase of a Suspension In order to evaluate the amount of additive per litre of the aqueous phase of a suspension, the volume in litres (L) of the aqueous phase is first determined by subtracting the volume of the solid phase (see solids volume determination above) from the total volume of the suspension. The mg of additive values quoted hereafter and throughout the present Application refer to the mg of active additive (i.e. of equivalent pure additive).

Polyelectrolyte Titration of Dispersant (PET, µEq/g)

The PET titration measures the total charged species of the dispersant and is evaluated using a Memotitrator Mettler DL 55 equipped with a Phototrode DP 660 commercialised by Mettler-Toledo, Switzerland.

Using the Memotitrator Mettler DL 55 for determining the polyelectrolyte content in the aqueous suspension, the measurements of the polyelectrolyte content was carried out by weighing a sample of the calcium carbonate suspension into a titration vessel and diluting said sample with deionized water up to a volume of approximately 40 ml. Subsequently, 10 ml of 0.01 M cationic poly(N,N-dimethyl-3,5-dimethylene-piperidinium chloride) (PDDPC; obtained from ACROS Organics, Belgium) are slowly added under stirring into the titration vessel within 5 min. and then the content of the vessel is stirred for another 20 min. Afterwards the suspension is filtered through a 0.2 µm mix-ester membrane filter (Ø47 mm) and washed with 5 ml of deionized water. The thus obtained filtrate is diluted with 5 ml of phosphate buffer pH 7 (Riedel-de Haën, Germany) and then 0.01 M of a potassium polyvinylsulfate (KPVS; obtained from SERVA Feinbiochemica, Heidelberg) solution is added slowly to the filtrate to titrate the excess of cationic reagent. The endpoint of titration is detected by a Phototrode DP660, which is adjusted to 1200 to 1400 mV in deionized water, prior to such measurement. The charge calculation is carried out according to the following evaluation:

$$Q_{atro} = \frac{((V_{PDDPC*1PDA}) - V_{KPVS})*(-1000)}{E_P * Fk} \quad [\mu Val/g]$$

$$w_{atro} = -\frac{Q_{atro}}{K_{DM} * 100} \quad [\%]$$

Calculation of the optimal sample weight:

$$E_P = \frac{60}{w_{DM} * K_{DM} * Fk}$$

Calculation of adapted sample weight for 4 ml consumption:

$$E_{4\,ml} = \frac{E_1 * 6}{(10 - V_{KPVS\text{-}1})}$$

Abbreviations
$E_p$ = sample weight [g]
$w_{DM}$ = Dispersing agent content in[%]
$K_{DM}$ = Dispersing agent constant [μVal/0.1 mg dispersing agent]
Fk = Solids content[%]
$V_{PDDPC}$ = Volume PDDPC [ml]
$V_{KPVS}$ = Volume KPVS [ml]
$t_{PDDPC}$ = Titer PDDPC
$E_{DM}$ = Dispersing agent weight [mg]
Q = Charge [μVal/g]
$w_{atro}$ = Dispersing agent content atro[%]
$E_I$ = Sample weight of experiment to be optimised [g]
$V_{KPVS,1}$ = experimental consumption KPVS [ml] of experiment to be optimised

Example 1

This example implements a natural calcium carbonate of Norwegian origin obtained by first autogenously dry grinding 10 to 300 mm calcium carbonate rocks to a fineness corresponding to a $d_{50}$ of between 42 to 48 and subsequently wet grinding this dry-ground product in water in a 1.4-litre vertical attritor mill (commercialised under the name Dynomill (Bachofen, Switzerland) with a volume of 1.4 L and using 2.7 kg $ZrO_2/ZrSiO_4$ grinding beads having a bead diameter 0.7-1.5 mm) at a weight solids content of between 5 and 15% by weight, until 95% by weight of the particles have a diameter <2 μm, 73% by weight of the particles have a diameter <1 μm, 8% by weight of the particles have a diameter <0.2 μm and a $d_{50}$ of 0.61 μm is reached. During the grinding processes, no dispersing or grinding aids are added.

The obtained suspension is then concentrated using a filter press to form a filter cake having a volume solids content of approximately 45% by volume. A subsequent thermal concentration following the addition of 0.45% by weight, based on the weight of solids, of a 50 molar % sodium-neutralised polyacrylic acid (Mw=12 000 g/mol, Mn=5 000 g/mol) and 0.20% by weight, based on the weight of solids, of sodium dihydrogen phosphate, leads to a suspension having a volume solids content of approximately 50% by volume. The final suspension has an anionic charge of approximately 73 μEq/g of dry equivalent calcium carbonate.

2 kg of this suspension are then introduced in a 3-litre beaker having a diameter of 15 cm. A Visco-Jet™ mechanical stirring unit (equipped with an 11 cm-diameter stirrer), is introduced in the beaker such that the stirrer is located approximately 1 cm above the bottom of the beaker and approximately 1 to 2 cm under the upper suspension surface. The initial suspension conductivity and pH values measured are reported in the table below.

Under stirring at 90 rpm, the additive type (in the form of an aqueous solution) indicated in each of the tests described in the table below (PA=additive according to the prior art, IN=additive according to the present invention), is added in the indicated amount to the slurry over a period of one minute. After completed addition, the slurry is stirred for an additional 10 minutes, after which time the suspension pH and conductivity are measured.

TABLE 1

| Test | | Suspension solid volume content (vol. %) | Initial suspension conductivity (±10 μS/cm) -- pH (± 0.1) | Additive Type (in solution)/ Solution concentration | Additive addition amount (mg/L of aqueous phase) | Conductivity (±10 μS/cm) -- pH (± 0.1) after additive addition | μS/cm/ pH unit |
|---|---|---|---|---|---|---|---|
| 1 | PA | 49.4% | 1 643 -- 8.7 | KOH/30% | 2 109 | 1 927 -- 10.8 | 135 |
| 2 | IN | 49.4% | 1 643 -- 8.7 | AMP***/75% | 7 909 | 1 729 -- 10.7 | 43 |
| 3 | IN | 49.4% | 1 643 -- 8.7 | AMP***/75% | 13 182 | 1 709 -- 10.9 | 30 |

***AMP comprising between 3 and 5% of 2-methyl-2(methylamino)-1-propanol

The results of the above table show that the objectives are attained solely by the process according to the invention.

Example 2

This example implements the same calcium carbonate suspension as implemented in Example 1 and according to the same protocol except that the additive indicated in each of the tests described in the table below is introduced while stirring the filter-cake suspension at 200 rpm using a Pendraulik™ mechanical stirring unit equipped with a 5 cm-diameter tooth disc stirrer.

TABLE 2

| Test | | Suspension solid volume content (vol. %) | Initial suspension conductivity (±10 μS/cm) -- pH (± 0.1) | Additive Type (in solution)/ Solution concentration | Additive addition amount (mg/L of aqueous phase)) | Conductivity (±10 μS/cm) -- pH (± 0.1) after additive addition | μS/cm/ pH unit |
|---|---|---|---|---|---|---|---|
| 4 | PA | 49.4% | 1 080 -- 9.7 | KOH/30% | 527 | 1 228 -- 10.8 | 135 |
| 5 | PA | 49.4% | 1 080 -- 9.7 | NH$_4$OH/29% | 4 129 | 1 177 -- 10.5 | 121 |
| 6 | PA | 49.4% | 1 080 -- 9.7 | MEA >99% | 1 561 | 1 190 -- 10.2 | 200 |
| 7 | IN | 49.4% | 1 080 -- 9.7 | AMP***/75% | 1 130 | 1 130 -- 10.8 | 30 |

***AMP comprising between 3 and 5% of 2-methyl-2(methylamino)-1-propanol

The results of the above table show that the objectives are attained solely by the process according to the invention.

Example 3

This example implements a natural calcium carbonate of Norwegian origin obtained by first autogenously dry grinding 10 to 300 mm calcium carbonate rocks to a fineness corresponding to a $d_{50}$ of between 42 to 48 µm, and subsequently wet grinding this dry-ground product in water to which 0.65% by weight, based on the equivalent dry weight of the solids material, of a sodium and magnesium-neutralised polyacrylate (Mw=6 000 g/mol, Mn=2 300 g/mol), in a 1.4-litre vertical attritor mill (commercialised under the name Dynomill (Bachofen, Switzerland) with a volume of 1.4 L and using 2.7 kg $ZrO_2/ZrSiO_4$ grinding beads having a bead diameter 0.7-1.5 mm) at a weight solids content of 77.5% by weight, and recirculated through the mill until 90% by weight of the particles have a diameter <2 µm, 65% by weight of the particles have a diameter <1 µm, 15% by weight of the particles have a diameter <0.2 µm and a $d_{50}$ of 0.8 µm is reached.

The finally obtained suspension after grinding had a solids content of 56.9% by volume. The final suspension has an anionic charge of approximately 65 µEq/g of dry equivalent calcium carbonate.

2 kg of this suspension are then introduced in a 3-litre beaker having a diameter of 15 cm. A Visco-Jet™ mechanical stirring unit (equipped with an 11 cm-diameter stirrer), is introduced in the beaker such the stirrer is located approximately 1 cm above the bottom of the beaker and approximately 1-2 cm under the upper suspension surface. The initial suspension conductivity and pH values measured are reported in the table below.

Under stirring at 90 rpm, the additive type (in the form of an aqueous solution) indicated in each of the tests described in the table below (PA=additive according to the prior art, 1N additive according to the present invention), is added in the indicated amount to the slurry over a period of one minute. After completed addition, the slurry is stirred for an additional 10 minutes, after which time the suspension pH and conductivity are measured.

10 to 300 mm calcium carbonate rocks to a fineness corresponding to a $d_{50}$ of between 42 to 48 µm, and subsequently wet grinding this dry-ground product in water in a 1.4-litre vertical attritor mill (commercialised under the name Dynomill (Bachofen, Switzerland) with a volume of 1.4 L and using 2.7 kg $ZrO_2/ZrSiO_4$ grinding beads having a bead diameter 0.7-1.5 mm) at a weight solids content of between 21 and 25% by weight, and recirculated through the mill until 95% by weight of the particles have a diameter <2 µm, 60% by weight of the particles have a diameter <1 µm, 15% by weight of the particles have a diameter <0.2 µm and a $d_{50}$ of approximately 0.8 µm is reached.

The finally obtained suspension after grinding was mechanically concentrated by a filter press to a solids content of approximately 50% by volume. The so concentrated filter cake was dispersed under shear using 0.33% by weight of a sodium salt of 1:1 molar maleic acid/acrylic acid copolymer. The final slurry had a solids of 49.4% by volume.

2 kg of this suspension are then introduced in a 3-litre beaker having a diameter of 15 cm. A ViscoJet™ mechanical stirring unit (equipped with an 11 cm-diameter stirrer), is introduced in the beaker such the stirrer is located approximately 1 cm above the bottom of the beaker and approximately 1-2 cm under the upper suspension surface. The initial suspension conductivity and pH values measured are reported in the table below.

Under stirring at 90 rpm, the additive type (in the form of an aqueous solution) indicated in each of the tests described in

TABLE 3

| Test | | Suspension solid volume content (vol. %) | Initial suspension conductivity (±10 µS/cm) -- pH (± 0.1) | Additive Type (in solution)/ Solution concentration | Additive addition amount (mg/L of aqueous phase) | Conductivity (±10 µS/cm) -- pH (± 0.1) after additive addition | µS/cm/ pH unit |
|---|---|---|---|---|---|---|---|
| 8 | PA | 56.9% | 1175 -- 9.8 | NaOH/30% | 2080 | 2080 -- 11.9 | 283 |
| 9 | IN | 56.9% | 1175 -- 9.8 | AMP***/95% | 3566 | 1185 -- 10.4 | 6 |

***AMP comprising between 3 and 5% of 2-methyl-2(methylamino)-1-propanol

The results of the above table show that the objectives are attained solely by the process according to the invention.

Example 4

This example implements a natural calcium carbonate of Norwegian origin obtained by first autogenously dry grinding the table below (PA=additive according to the prior art, IN=additive according to the present invention), is added in the indicated amount to the slurry over a period of one minute. After completed addition, the slurry is stirred for an additional 10 minutes, after which time the suspension pH and conductivity are measured.

TABLE 4

| Test | | Suspension solid volume content (vol. %) | Initial suspension conductivity (±10 µS/cm) -- pH (± 0.1) | Additive Type (in solution)/ Solution concentration | Additive addition amount (mg/L of aqueous phase) | Conductivity (±10 µS/cm) -- pH (± 0.1) after additive addition | µS/cm/pH unit |
|---|---|---|---|---|---|---|---|
| 8 | PA | 49.4% | 1034 -- 9.7 | TEA****/100% | 1021 | 1035 -- 9.7 | -- |
| 9 | IN | 49.4% | 1034 -- 9.7 | AMP***/75% | 1582 | 1040 -- 10.2 | 12 |

***AMP comprising between 3 and 5% of 2-methyl-2(methylamino)-1-propanol
****TEA = triethanolamine, pure The results of the above table show that the objectives are attained solely by the process according to the invention. Namely, triethanolamine is not capable of increasing the pH, meaning that it does not fulfill the requirements of the skilled man.

The invention claimed is:

1. A method to increase the pH of an aqueous suspension comprising:
    providing an aqueous suspension comprising 25 to 62 vol. % of a calcium carbonate-comprising material, wherein the calcium carbonate-comprising material further contains 0.1 to 1 mg of dispersant per m$^2$ of mineral matter and the pH of the suspension is 8.5 to 11;
    adding 2-amino-2-methyl-1-propanol (AMP) in an amount of from 500 to 15000 mg per litre of an aqueous phase of the suspension so that the pH of the suspension is increased by at least 0.3 units while the conductivity change of the suspension is not increased by more than 100 µS/cm/pH unit.

2. The method according to claim 1, wherein the suspension has a conductivity of between 700 and 2000 µS/cm prior to AMP addition.

3. The method according to claim 1, wherein following the addition of AMP, the conductivity change is not more than 70 µ/cm/pH unit.

4. The method according to claim 1, wherein following the addition of AMP, the change of the suspension conductivity is maintained at a value within 10% of the suspension conductivity value prior to AMP addition.

5. The method according to claim 1, wherein prior to addition of AMP, the suspension has a pH between 9 and 10.3.

6. The method according to claim 1, wherein AMP is added to said suspension in an amount to increase the pH of the suspension by at least 0.4 pH units.

7. The method according to claim 1, wherein when the suspension pH prior to AMP addition is between 8.5 and 9, AMP is added to the suspension in an amount to increase the pH of the suspension by at least 1 pH unit, and when the suspension pH prior to AMP addition is between 9 and 10, AMP is added to the suspension in an amount to increase the pH of the suspension by at least 0.7 pH units.

8. The method according to claim 1, wherein prior to AMP addition, the suspension has a temperature of between 5 and 100° C.

9. The method according to claim 1, wherein AMP is added to the suspension in an amount of from 1000 to 5000 mg per litre of the aqueous phase of the suspension.

10. The method according to claim 1, wherein the AMP comprises less than 6% by weight of secondary alkanol amines or 2-methyl-2(methylamino)-1-propanol as impurities.

11. The method according to claim 1, wherein the AMP comprises from 2 to 5% by weight of secondary alkanol amines or 2-methyl-2(methylamino)-1-propanol as impurities.

12. The method according to claim 1, wherein the dispersant is an anionic dispersant.

13. The method according to claim 1, wherein the dispersant is a homo- or co-polymer of acrylic acid.

14. The method according to claim 1, wherein prior to addition of AMP, the suspension has an anionic charge of from 2 to 200 µVal/g of equivalent dry weight of mineral material.

15. The method according to claim 1, wherein the calcium carbonate-comprising material comprises at least 50% by weight of calcium carbonate relative to the total weight of said calcium carbonate-comprising material.

16. The method according to claim 1, wherein the calcium carbonate of the carbonate-comprising material is a precipitated calcium carbonate (PCC), a natural ground calcium carbonate (NGCC), a surface-reacted calcium carbonate (SRCC), or any mixture thereof.

17. The method according to claim 1, wherein the suspension comprises from 45 to 60 vol. % of the calcium carbonate-comprising material based on the total volume of the suspension.

18. The method according to claim 1, wherein following addition of AMP to the suspension, the suspension is introduced in a unit equipped with a conductivity-based regulation device.

19. The method according to claim 1, wherein following addition of AMP to the suspension, the suspension is introduced in a container or unit up to a level determined by measurement of the suspension conductivity.

20. The method according to claim 1, wherein following addition of AMP to the suspension, the suspension is passed through a passage having a suspension throughput regulated as a function of the suspension conductivity.

* * * * *